(12) United States Patent
Schindler et al.

(10) Patent No.: US 8,388,790 B2
(45) Date of Patent: Mar. 5, 2013

(54) MULTILAYERED BODY COMPRISING AN ELECTROCONDUCTIVE POLYMER LAYER AND METHOD FOR THE PRODUCTION THEREOF

(75) Inventors: Ulrich Schindler, Furth/Bayern (DE); Walter Lehnberger, Treuchtlingen (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 725 days.

(21) Appl. No.: 12/309,517

(22) PCT Filed: Jul. 19, 2007

(86) PCT No.: PCT/EP2007/006422
§ 371 (c)(1),
(2), (4) Date: Sep. 22, 2009

(87) PCT Pub. No.: WO2008/009447
PCT Pub. Date: Jan. 24, 2008

(65) Prior Publication Data
US 2010/0078065 A1 Apr. 1, 2010

(30) Foreign Application Priority Data

Jul. 21, 2006 (DE) .................. 10 2006 033 887
Nov. 13, 2006 (DE) .................. 10 2006 053 665

(51) Int. Cl.
*B44C 1/17* (2006.01)
(52) U.S. Cl. ........ 156/239; 156/62.2; 156/230; 156/242; 156/276; 156/289; 156/283; 264/109; 264/112; 264/113; 264/125; 264/126; 427/189; 427/195; 427/375; 427/384; 427/407.1; 427/412.1
(58) Field of Classification Search .................. None
See application file for complete search history.

(56) References Cited

U.S. PATENT DOCUMENTS

| | | | |
|---|---|---|---|
| 5,916,399 A * | 6/1999 | Olsen | 156/230 |
| 6,180,226 B1 * | 1/2001 | McArdle et al. | 428/332 |
| 6,800,166 B2 * | 10/2004 | Kosaka et al. | 156/230 |
| 6,946,676 B2 | 9/2005 | Kelley et al. | |
| 2002/0028331 A1 | 3/2002 | Senoo et al. | |
| 2002/0108708 A1 * | 8/2002 | Murano | 156/307.3 |
| 2002/0117252 A1 * | 8/2002 | Baldwin | 156/178 |
| 2003/0059987 A1 | 3/2003 | Sirringhaus et al. | |
| 2004/0058166 A1 * | 3/2004 | Nakamura | 428/425.1 |
| 2004/0236200 A1 | 11/2004 | Say et al. | |
| 2005/0053801 A1 | 3/2005 | Elschner et al. | |
| 2005/0211293 A1 | 9/2005 | Enomoto et al. | |
| 2006/0124922 A1 | 6/2006 | Kim et al. | |
| 2006/0160277 A1 | 7/2006 | Sirringhaus et al. | |
| 2007/0077679 A1 | 4/2007 | Wild et al. | |

FOREIGN PATENT DOCUMENTS

| | | |
|---|---|---|
| DE | 10349963 | 6/2005 |
| EP | 1329955 | 7/2003 |
| EP | 1457099 | 6/2005 |
| WO | WO 02/17392 | 2/2002 |
| WO | WO 2004/066477 | 11/2004 |
| WO | WO 2005/039868 | 5/2005 |

* cited by examiner

*Primary Examiner* — Mark A Osele
*Assistant Examiner* — Nickolas Harm
(74) *Attorney, Agent, or Firm* — Hoffmann & Baron, LLP

(57) ABSTRACT

There is described a process for the production of a multilayer body (4) having an electrically conductive layer (42₁) arranged on a carrier layer (41), in which there is provided a transfer film (5) having a transfer layer (52) of an electrically conductive polymer. The electrically conductive layer is transferred from the transfer film (5) on to the multilayer body (4). There are also provided a transfer film and a multilayer body produced in accordance with the process.

14 Claims, 9 Drawing Sheets

MULTILAYERED BODY COMPRISING AN ELECTROCONDUCTIVE POLYMER LAYER AND METHOD FOR THE PRODUCTION THEREOF

This application claims priority based on an International Application filed under the Patent Cooperation Treaty, PCT/EP2007/006422, filed on Jul. 19, 2007 and German Application Nos. DE 102006033887.1-33, filed on Jul. 21, 2006 and DE 102006053665.7, filed on Nov. 13, 2006.

BACKGROUND OF THE INVENTION

The invention concerns a multilayer body with an electrically conductive polymer layer, a process for the production thereof, and a transfer film for the production of the multilayer body.

Conventional products and processes in the semiconductor industry are being increasingly replaced by products and processes involving organic layers. Although in many cases organic semiconductors and conductors do not yet meet all technical demands nonetheless significant advances are becoming apparent, for example in relation to organic solar cells or polymer solar cells.

For constructing organic solar cells there is a need inter alia for organic conductor tracks and electrode layers, the electrical properties of which must be adjustable. It is known for the electrical conductivity of organic layers to be electrochemically adjusted. That however imposes limits on mass production using the roll-to-roll process which is geared to constant manufacturing conditions.

Electrically conductive polymers can frequently occur in the form of dispersions with a low solids proportion. It is precisely such dispersions that cannot be applied in structured form by printing processes, or can be so applied only with loss of quality, because they generally involve a water-like consistency.

SUMMARY OF THE INVENTION

Now the object of the invention is to provide a multilayer body having electrically conductive organic layers which are adjustable in their electrical properties without the use of chemical processes, and to provide a process suitable for mass production for the formation of structured electrically conductive organic layers.

The object of the invention is attained by a process for the production of a multilayer body having an electrically conductive layer arranged on a carrier layer, wherein it is provided that a transfer film with a transfer layer having an electrically conductive polymer is provided, and the electrically conductive layer is formed by transferring the transfer layer from the transfer film on to the multilayer body.

The object is further attained by a transfer film, in particular an embossing film, comprising a carrier layer and an electrically conductive transfer layer, wherein it is provided that the transfer layer has N electron-conducting layers and N+1 electrically conductive polymer layers, wherein an electrically conductive polymer layer and an electron-conducting layer is arranged alternately and $N \geq 1$.

The object is further attained by a multilayer body having a structured electrically conductive layer wherein it is provided that the electrically conductive layer has at least two mutually superposed electrically conductive polymer layers.

It is proposed with the process according to the invention that a transfer film is used, the transfer layer of which is formed from an electrically conductive polymer.

Numerous quality problems are avoided by the electrical properties of the electrically conductive layer being basically set in production of the polymer dispersion and/or production of the transfer film. Now, in particular the geometrical properties of the electrically conducting layer, that is to say their contour and their thickness are determined when transferring the transfer layer on to the multilayer body. The contour of the electrically conducting layer can be produced with a high level of contour sharpness by the transfer layer according to the invention.

Further advantages are afforded by virtue of the provision of a transfer film with a carrier layer and an electrically conductive transfer layer which, besides the electrically conductive polymer layer, has at least one electron-conducting layer. That electron-conducting layer means that the electrical conductivity of the transfer layer of the transfer film can be markedly increased without having to forego the advantages of simple transfer and layer-wise construction of conductive structures. For example it is possible in that way to emboss antennas for RFID transponders, in which case the antennas can have good electrical efficiency because of the good conductivity of the transfer layer of the transfer film.

It is further advantageous that for example the efficiency of the photovoltaic effect which takes place in the organic semiconductor layer of an organic solar cell can be increased by means of the electron-conducting layers, for example by reducing the work function. If for example the electron-conducting layer is a thin semitransparent layer, it can be further protected from oxidation in the composite arrangement although the advantages such as transparency and light conductivity are enjoyed.

The multilayer body according to the invention has an electrically conducting layer of precisely adjustable thickness, wherein the thickness tolerance is substantially determined by the thickness of the transfer layer. Accordingly for example the conductivity of the electrical layer is adjustable by the number of transferred transfer layers. If n transfer layers are transferred then the electrically conductive layer produced in that fashion has n-times the conductivity of the transfer layer transferred in each production step. The resistance or surface resistance can be calculated in accordance with the equations in respect of the parallel connection of resistors.

Transfer of the transfer layer portion from the transfer film on to the multilayer body can advantageously be implemented in a roll-to-roll process. The multilayer body can be a film body from which portions are separated after the conclusion of the manufacturing procedure, those portions then being marketed.

Further advantageous features are set forth in the appendant claims.

It can be provided that a non-film-formed transfer layer is provided. A non-film-formed transfer layer does not form a continuous coherent film. The non-film-formed transfer layer is of a powdery consistency if it is released from the carrier layer of the transfer film with the thumb test. That leads to the assumption of the formation of desired-rupture locations in the transfer layer, which are produced by the transfer layer being applied from a dispersion and then the dispersing agent being rapidly expelled at a temperature of between 30 and 40° C. Consequently a continuous coherent polymer film is not formed and the adhesion to the carrier film is so slight that the transfer layer can be easily detached in the transfer procedure. A film-formed transfer layer, upon being transferred on to the multilayer body, cannot be at all detached or can be incompletely detached from the carrier film of the transfer film and/or cannot be separated off in a defined manner.

It can further be provided that the transfer layer is in the form of a polymer transfer layer.

It can further be provided that a transfer layer is provided, in which the electrically conductive polymer is concentrated in domains and the transfer layer is preferably separable along the domain boundaries. Electrically conductive polymers can be in the form of mixtures of substances and can involve structures in which the electrically conductive polymer forms domains which are embedded in a matrix of a second polymer. The electrically conductive polymer can also still occur in a low level of concentration in the matrix. Conventional layers comprising the electrically conductive polymer form a firmly coherent film which does not have any preferential rupture limits. In contrast the transfer layer according to the invention can involve an electrically conductive polymer layer in which the domain boundaries serve as desired-rupture locations so that the transfer layer can be transferred in structured relationship. The domains can be for example of a cigar-shaped configuration in plan view, of dimensions 500 nm×1000 nm. They may however also involve circular domains, in which case the thickness of the domains can be substantially determined by the thickness of the transfer layer. The domains can therefore be of a flat cake-shaped structure.

It can be provided that the electrically conductive layer is formed from one or more mutually superposed transfer layers by structured embossing of the carrier film on to the multilayer body. In that case hot embossing can be preferred. The surface geometry of the electrically conductive layer can be easily determined by way of the surface geometry of the embossing punch. In that case it is possible to achieve very high levels of resolution and very high levels of register accuracy. The resolution limits are essentially determined by the size of the domains of the transfer layer of the transfer film.

In a further advantageous configuration it is provided that the electrically conductive layer is formed from one or more mutually superposed transfer layers by thermotransfer printing on the multilayer body. In that case it can be provided that the transfer film has a wax separation layer between the transfer layer portion and the carrier film. As regards the attainable resolution it can be assumed that the attainable resolution is essentially determined by the configuration of the thermotransfer printing head.

It can further be provided that to produce gradients in respect of the resistance along the surface normal of the electrically conductive layer transfer layers are used which involve different electrical conductivity.

It can be provided that the transfer layer is solidified in the operation of transfer from the transfer film on to the multilayer body due to the action of temperature and/or due to the action of pressure and/or by chemical reaction and is joined to the layer of the multilayer body, that is disposed under the transfer layer. It can also be provided that additives which for example improve adhesion or interlayer adhesion are added to the polymers.

It can however also be provided that the transfer layer after transfer from the transfer film on to the multilayer body experiences film formation due to the action of temperature and/or the action of pressure and/or chemical reaction and is joined to the layer of the multilayer body, that is arranged under the transfer layer. It can also be provided that the transfer layer is applied to non-conducting other layers which crosslink in a subsequent process and give rise to interlayer adhesion.

A further advantageous configuration can provide that a transfer film is used which is itself not homogeneous and which for example is of different thicknesses at different locations or also has a decoration.

It can further be provided that a transfer film is used in which the conductive layer is embedded into or enclosed by other layers which in turn can have different properties.

It can further be provided that the transfer layer experiences film formation both upon transfer and also after transfer from the transfer film on to the multilayer body due to the action of temperature and/or the action of pressure and/or chemical reaction and is joined to the layer of the multilayer body, that is disposed under the transfer layer. It can be provided for example that the finished conductive layer is then subjected to a heat treatment to improve homogeneity and adhesive strength, in which case the heat treatment can be implemented in a protective gas atmosphere or in a vacuum.

Further advantages in this connection are for example applications to rough and prestructured layers which cannot be coated by a normal coating process. It is therefore possible to provide a multilayer body in which the electrically conductive layer is arranged on a layer with a rough and/or structured and/or partially structured surface.

The parameters to be adjusted can be determined preferably by tests, by a procedure whereby, starting from initial values, the values of a parameter are varied and the values of the remaining parameters are kept constant. It is generally sufficient to vary four parameters: temperature, pressure, duration and the substrate to which embossing is applied, in particular the roughness thereof and the chemical composition involved.

The electrically conductive layer according to the invention, after the production thereof, can also be of a sandwich-like structure which is recognisable in a sectional view or at the perpendicular outside edges which are structured similarly to the edge of a book, if homogeneous film formation has not taken place in a perpendicular direction in relation to the layers.

It can be provided that the transfer layer of the transfer film is formed from PEDOT/PSS. PEDOT/PSS is an abbreviation for a mixture of poly(3,4-ethylenedioxythiophene) and poly(styrenesulfonate), that is to say a polymer mixture of two ionomers. Both components of PEDOT/PSS contribute different charge carriers for affording electrical conductivity: PEDOT positive charge carriers and PSS negative charge carriers. A PEDOT/PSS layer has domains with a predominant proportion of PEDOT which are bound into a PSS matrix or into a PEDOT/PSS matrix with a low proportion of PEDOT.

PEDOT/PSS is preferably represented as an aqueous dispersion of polymer particles. It is preferably provided that the transfer layer is applied from an aqueous PEDOT/PSS dispersion with a proportion of about 1.2% by weight.

It can be provided that PEDOT/PSS is used in a weight ratio of between 1:20 and 1:1. Preferably PEDOT/PSS is used in a weight ratio of 1:1 as it has the highest electrical conductivity.

It can further be provided that a transfer film is used, whose transfer layer is of a layer thickness >500 nm.

It can also be provided that a transfer film is used, whose transfer layer is of a layer thickness of between 50 nm and 500 nm.

It can preferably be provided that a transfer film is used, whose transfer layer is of a layer thickness of between 5 nm and 50 nm. An electrically conductive layer of a thickness of 50 nm can therefore be made up for example from 10 through 1 transfer layers.

It can further preferably be provided that a transfer film is used, whose transfer layer is of a layer thickness of between 5 nm and 10 nm.

In a further advantageous configuration it can be provided that a transfer film is used, in which the regions which are removed are present in domains.

It can be provided that the electrically conductive layer of the multilayer body according to the invention comprises at least two mutually superposed electrically conductive polymer layers. In the case of only one transferred polymer layer, the electrically conductive layer can have defects which can cast doubt on the function thereof in accordance with the intended use. In addition with just one polymer layer the adjustability of the electrical parameters, for example electrically conductivity, is limited. Therefore more than one transferred polymer layer is preferred.

It can be provided that the at least two mutually superposed polymer layers are identically structured. The electrically conductive layer of such a multilayer body can therefore be characterised in that it is made up in each region from the same number of mutually superposed polymer layers.

Alternatively it can be provided that the at least two mutually superposed polymer layers are structured differently. In that way it is possible for example to form regions involving different electrical conductivity, that is to say regions of the electrically conductive layer can for example perform the function of a resistor. It can be provided for example that the voltage drop occurring at a resistor is evaluated and serves as an input value for an electronic circuit, for example a regulating circuit or an alarm device.

It can further be provided that the mutually superposed electrically conductive polymer layers are formed from different materials.

It can advantageously be provided that the electrically conductive polymer layer comprises PEDOT/PSS.

It can further be provided that the electrically conductive polymer layer is formed from PEDOT/PSS in a weight ratio of between 1:20 and 1:1.

The electrically conductive layer can be in the form of a separation layer between a semiconductor layer and an electrode layer.

It can also be provided that the electrically conductive layer is in the form of a conductor track.

In a further advantageous configuration it is provided that the electrically conductive layer has electron-conducting particles. A layer modified in that way can have increased electrical conductivity. The electron-conducting particles can also act as electrical screening. In the case of superposed light generation however they can also serve as scattering centers. In that case the particles can be present differently in respect of shape, material, size and concentration.

It can also be provided that at least one electron-conducting layer is arranged on or under the electrically conductive layer.

It is possible for the electron-conducting particles and/or the electron-conducting layer to comprise silver, gold, copper, titanium, aluminum or a combination of those metals.

It is further possible for the electrically conductive layer to be arranged on a layer with a rough and/or structured and/or partially structured surface.

It can further be provided that the electrically conductive layer and/or the electron-conducting layer provides personalised information.

Further advantageous configurations are directed to the transfer film. As already stated hereinbefore the transfer layer of the transfer film has for example a non-film-formed PEDOT/PSS layer and at least one electron-conducting layer.

It can advantageously be provided that the electron-conducting layer comprises a metallic layer.

It can further be provided that the electron-conducting layer comprises a succession of two or more metallic layers, wherein each two mutually adjoining metallic layers respectively comprise different material. If for example there are three metallic layers identified by A, B and C, it is then possible to involve successions such as A/B/C, C/B/A, A/C/B or A/B/A.

That affords inter alia the advantage that the chemical stability can be improved in relation to adjoining layers but also in relation to the ambient environment. The adhesion to other layers is further improved.

It is possible for the two electron-conducting layers adjacent to an electrically conductive polymer layer to involve the same succession of metallic layers.

It is however also possible for the two electron-conducting layers adjacent to an electrically conductive polymer layer to involve a different succession of the metallic layers.

The metallic layers can comprise silver, gold, copper, titanium, aluminum or a combination of those metals. The metallic layers can be applied for example by sputtering or vapor deposition, with layer thicknesses in the range of between 10 nm and 50 nm being preferred.

It can advantageously be provided that the electrically conductive polymer layer comprises PEDOT/PSS. The PEDOT/PSS layer advantageously involves a non-film-formed PEDOT/PSS layer, as described hereinbefore. The PEDOT/PSS is first film-formed by the transfer operation by means of heat and/or pressure and then securely adheres to the substrate to which it was applied by the embossing procedure.

The transfer layer of the transfer film advantageously has a release layer which permits release of the transfer layer from the carrier layer, the release layer comprising an electrically conductive polymer. Such a release layer can make a contribution to current conduction after the embossing operation involving the transfer layer and the film-forming operation. It then performs a dual function insofar as, as a non-film-formed polymer layer, it is easily releasable from the carrier layer and, as a film-formed polymer layer, it forms a firmly adhering, electrically conductive layer.

It can be provided that the release layer comprises PEDOT/PSS.

It can further be provided that, on the side remote from the carrier layer, the transfer layer has an adhesive layer for fixing the transfer layer on a target substrate and the adhesive layer comprises an electrically conductive polymer. In this case also use is made of the differing behaviour of a non-film-formed polymer layer and a film-formed polymer layer. This can involve a polymer layer formed from the same material as the release layer, which by virtue of film formation in the embossing operation acts like an adhesive.

The adhesive layer can comprise PEDOT/PSS. In addition it is also possible for additives for improving adhesion to be added to the PEDOT/PSS or for the PEDOT/PSS to be suitably modified.

It can further be provided that the transfer layer on the side remote from the carrier layer has a priming layer and the priming layer comprises an electrically conductive polymer. The priming layer can be provided for bonding purposes and can be formed from the same material as the above-described release layer and the adhesive layer.

The priming layer can comprise PEDOT/PSS. In addition it is also possible for additives for improving adhesion to be added to the PEDOT/PSS or for the PEDOT/PSS to be suitably modified.

In a further advantageous configuration it is provided that the transfer layer has an intermediate layer arranged between two electron-conducting layers and formed from an electrically conductive polymer. The intermediate layer can be provided to afford the bond between the two electron-conducting layers.

The intermediate layer can be formed from PEDOT/PSS. It is therefore possible to provide a transfer film having alternately mutually superposed electrically conducting polymer layers—preferably comprising non-film-formed PEDOT/PSS layers—and electron-conducting layers—preferably in the form of a layer composite of more than one metallic layer—, which can be adapted to many different conditions of use.

It can further be provided that the metallic layers are of differing thickness.

It is further possible for the electrically conductive polymer layers to be of differing thickness and/or to involve a different chemical composition.

Production of the transfer film according to the invention can be essentially effected in three successive steps which can be carried out in a roll-to-roll process.

In the first step the lowermost PEDOT/PSS layer can be applied to the carrier layer, in which respect care is to be taken to ensure that the PEDOT/PSS layer applied in that way is not film-formed after drying. That provides that after the embossing operation the PEDOT/PSS layer easily releases from the carrier layer. The lowermost PEDOT/PSS layer can therefore be used as a release layer so that it is possible to dispense with a special release layer. The lowermost PEDOT/PSS layer can be applied for example by intaglio printing, screen printing or coating.

In the second step one or more electron-conducting layers can be applied to the PEDOT/PSS layer, the thickness of the electron-conducting layers can advantageously be between . . . nm and . . . nm. If the electron-conducting layer is a metallic layer it can be applied for example by vapor deposition or sputtering. If a conductive paste is provide as the electron-conducting layer it can be applied by the processes referred to hereinbefore for application of the PEDOT/PSS layer. As already stated hereinbefore silver, gold, copper, titanium and aluminum are preferred as the metals. Combinations of metals are also possible by virtue of the layerwise structure of the electron-conducting layer, in which case the combinations can involve metallic alloys.

The third step is the application of one or more priming layers or one or more PEDOT/PSS layers. If only one priming layer or PEDOT/PSS layer was respectively involved as hereinbefore, it is included that those layers can be formed like the electron-conducting layers from a plurality of sublayers. The thickness of the PEDOT/PSS layers can be adjusted for example by multiple layer application.

It can be provided that steps 1 and 2 are repeated one or more times before production step 3 is implemented. In regard to production step 1 it is to be understood in that respect that the PEDOT/PSS layer, when repetitive steps are involved, is applied to the respectively upper layer of the embossing film.

It is possible for a polymer solar cell to be constructed with the transfer film according to the invention, the solar cell including an electrically conductive layer, formed from a transfer layer of the transfer film, that has an electrically conductive polymer. It is advantageous that the electrical layer can be 'made-to-measure' and in that way, in conjunction for example with the active layer of the solar cell, the efficiency of the solar cell can be increased.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
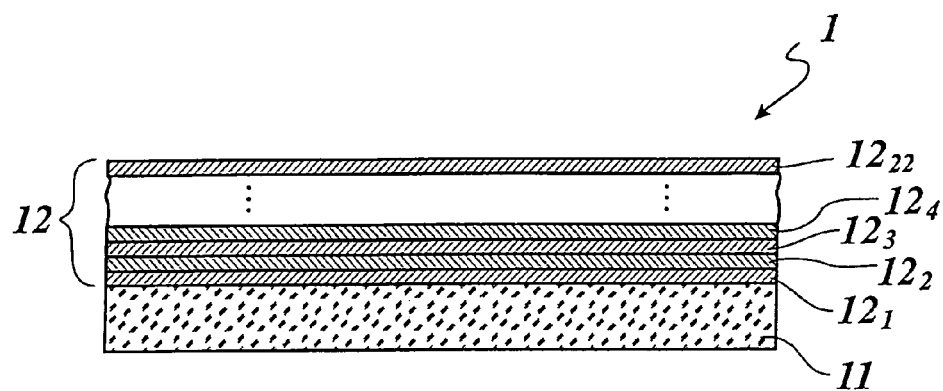
FIG. 1 shows a diagrammatic cross-section of a first embodiment of the multilayer body according to the invention.

FIG. 1 shows a multilayer body 1 produced by multiple embossing, comprising an electrically insulating carrier layer 11 and a PEDOT/PSS layer 12. PEDOT/PSS (poly(3,4-ethylenedioxythiophene) and polystyrene sulfonate) is a polymer mixture of ionomers. Both components contribute different charge carriers: PSS negative charge carriers and PEDOT positive charge carriers.

The carrier layer 11 involves Plexiglas of a thickness of between 1 and 2 mm. In the FIG. 1 embodiment the multilayer body is a test pattern for demonstrating the electrical properties of the PEDOT/PSS layer 12. The material and/or the thickness of the carrier layer 11 can be adapted to the purpose of use, for example to use of the multilayer body 1 as a polymer solar cell. The carrier layer 11 can be an organic semiconductor layer of that polymer solar cell, which is built up on further layers and a substrate, in which the PEDOT/PSS layer is applied in the form of a layer between the semiconductor layer and an electrode layer. Such further layers are not shown in FIG. 1.

The PEDOT/PSS layer 12 is made up of PEDOT/PSS sublayers $12_1$ through $12_{22}$ which are successively applied by embossing of a PEDOT/PSS embossing film. In that respect it is possible to envisage embossing different PEDOT/PSS types. In this connection it was established that applications to rough and prestructured layers are possible, which are not coated or which are highly inadequately coated by a normal coating process.

In the embodiments described with reference to FIG. 1 and the further Figures the PEDOT/PSS embossing film is formed by spreading a PEDOT/PSS dispersion on a carrier film and drying it. The dried PEDOT/PSS layer forms a transfer layer of the PEDOT/PSS embossing film.

The carrier film was applied by embossing to the carrier layer 11, with the temperature of the embossing wheel being adjusted to between 190 and 200° C. Some of the test multilayer bodies 1 were heated after the embossing operation for about 10 min at between about 130 and 150° C. respectively. That step serves for further homogenisation and film formation and for expelling residual solvents.

In a first example Baytron FCCP from H C Starck was used. Baytron FCCP has a solids proportion of 1.25% and was applied with a doctor R 30/3 (application weight 10 g/m² with a solids content of 38.54%). The consistency of that dispersion is in that case very low. The samples were then dried in an air flow of a hot air blower at between about 35 and 40° C. The drying time was about 2 minutes. The PEDOT/PSS layer produced with that process could be easily removed from the carrier film in a thumb test, with the PEDOT/PSS layer disintegrating as powder. That material property is caused by the fact that this involves a non-film-formed PEDOT/PSS layer, that is to say the PEDOT/PSS applied in accordance with the above-described process does not form a continuous coherent film.

The samples initially had an average surface resistance of 4.078 kΩ. After a further three-minute temperature treatment at 150° C. the samples had an average surface resistance of 3.856 kΩ. The samples were film-formed after the specified temperature treatment and could no longer be detached with the thumb test.

As a distinction in relation thereto the PEDOT/PSS layer dried in a drying cabinet at between 130° C. and 150° C. for about 5 minutes adhered more firmly to the carrier film and formed a firmly coherent and continuous film which could only be removed with difficulty when employing the friction test (thumb test). Equally the PEDOT/PSS layer dried with the above-mentioned processes at between 35 and 40° C., after prolonged storage (between 10 and 14 days), can form a more firmly adhering film and is therefore no longer suitable as a transfer layer for the PEDOT/PSS embossing film. It is therefore provided that the PEDOT/PSS embossing film is to be processed in close time relationship after production or the PEDOT/PSS embossing film is to be wound up so that the carrier film is at the same time a protective film for the PEDOT/PSS transfer layer and subsequent film formation in respect of the PEDOT/PSS transfer layer is prevented or at least greatly reduced. Long-term stability also depends on the PEDOT/PSS used.

In a second example Orgacon S500 Pedot from AGFA was applied in the above-described manner. Orgacon PEDOT has a solids proportion of 1.29% and was applied with a doctor R 30/3. After the drying operation an average surface resistance of 0.658 kΩ was measured; after temperature treatment at 150° C. for three minutes an average surface resistance of 0.703 kΩ was measured.

In a third example two different PEDOT layers were applied one over the other, more specifically Orgacon S500 with a solids proportion of 1.29% and Baytron FCCP with a solids proportion of 1.25%. The layers were also applied with the doctor R 30/3, wherein the doctor had an application weight of 10 g/m² in accordance with the solids proportion which was 38.54%. The samples were then dried in the air flow of a hot air blower at between about 35 and 40° C. The drying time was about 2 minutes. The samples initially involved an average surface resistance of 0.565 kΩ and after a further temperature treatment at 150° C. for three minutes had an average surface resistance of 0.613 kΩ. The samples were film-formed after that temperature treatment and could no longer be detached with the thumb test.

As the last-mentioned second example showed, the total surface resistance calculated from the individual values of the surface resistance coincides very well with the measured total resistance. It was assumed that the mutually superposed PEDOT/PSS layers can be modelled as a parallel connection of resistors.

$$1/R_{total} = 1/R_{Baytron\ FCCP} + 1/R_{Orgacon} = 1/4.078 k\Omega + 1/0.658 k\Omega = 1/0.5665 k\Omega R_{total} = 0.5665 k\Omega.$$

As stated above the measured total resistance was 0.565 kΩ.

It can also be provided that the PEDOT/PSS is applied to the carrier film by means of spin coating or also by way of nozzle coating and then dried in the manner described hereinbefore.

Figure 2:
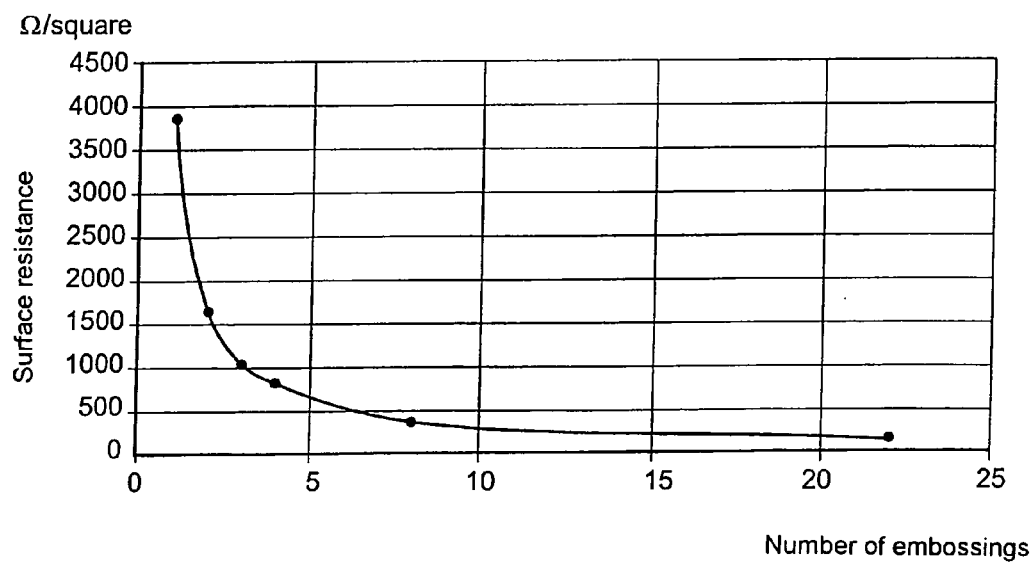
FIG. 2 shows a graph relating to the dependency of the surface resistance on the embossing number for the multilayer body of FIG. 1.

FIG. 2 now shows, in relation to FIG. 1, a graph illustrating the dependency of the surface resistance of the PEDOT/PSS layer 12 in dependence on the number of PEDOT/PSS sublayers $12_1$ through $12_{22}$. As can be seen from FIG. 2 the surface resistance is of a non-linear configuration, wherein in the embodiment shown in FIG. 2 the surface resistance has fallen to 9% of the initial value after 8 embossing steps and to about 4% of the initial value after a further 14 embossing steps. The surface resistance was determined in each case, as also in the above-mentioned three examples, using what is referred to as the 4-point method. This involves a measuring method which is employed inter alia in geophysics and in which the specific resistance of a body or a layer is determined without taking a sample by measurements at the surface.

TABLE 1

| Number of embossings | Measured surface resistance in ohms per square | Reciprocal of surface resistance |
| --- | --- | --- |
| 1 | 3860 | $2.6 \cdot 10^{-4}$ |
| 2 | 1620 | $6.1 \cdot 10^{-4}$ |
| 3 | 1030 | $9.7 \cdot 10^{-4}$ |
| 4 | 820 | $12.2 \cdot 10^{-4}$ |
| 8 | 350 | $28.6 \cdot 10^{-4}$ |
| 22 | 145 | $69.0 \cdot 10^{-4}$ |

Table 1 compares the measured surface resistances in dependence on the number of embossings to the calculated reciprocals of the surface resistance (conductance). Conductance is proportional to the number of embossings to a good approximation. It is therefore possible to produce PEDOT/PSS layers with a defined conductance by multiple embossing.

Figure 3:
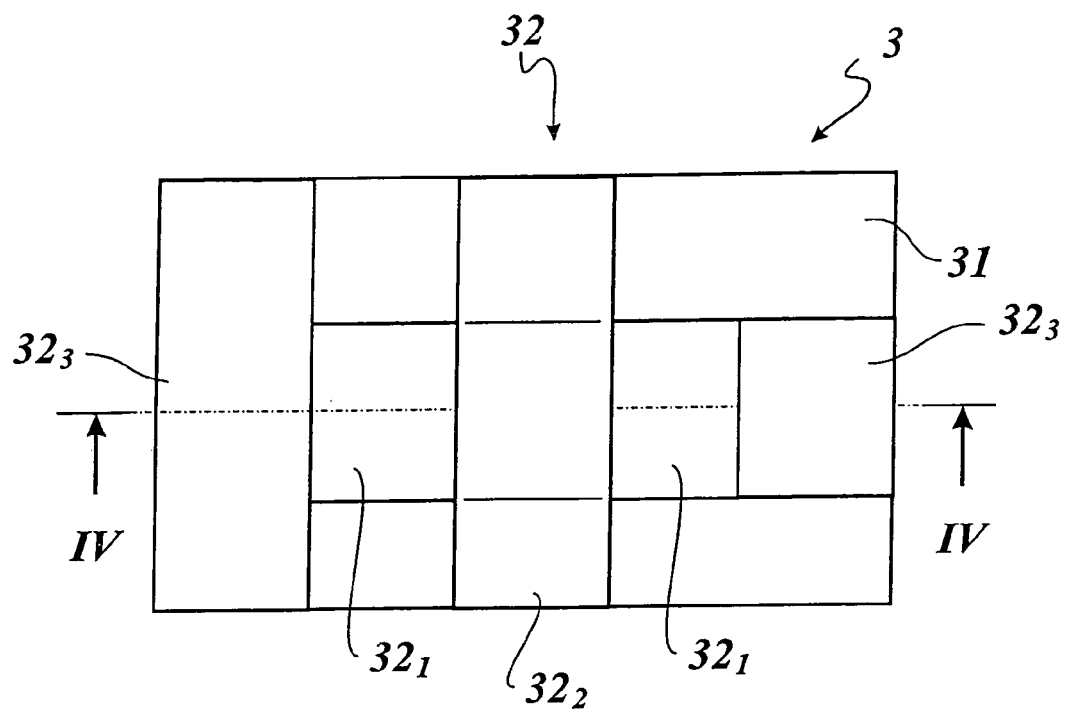
FIG. 3 shows a diagrammatic plan view of a second embodiment of the multilayer body according to the invention.

FIG. 3 now shows a multilayer body 3 which on a rectangular carrier layer 31 has a PEDOT/PSS layer 32 formed from three PEDOT/PSS sublayers $32_1$ through $32_3$. The PEDOT/PSS sublayer $32_1$ is in the form of a horizontally arranged strip-shaped region and is arranged directly on the carrier layer 31. The PEDOT/PSS sublayer $32_2$ is arranged over the PEDOT/PSS sublayer $32_1$ and has three mutually separate regions, wherein the left and the central regions are in the form of vertically extending strip-shaped regions which terminate with the horizontal edges of the carrier substrate 31 and the right-hand region covers over only the right-hand edge portion of the PEDOT/PSS sublayer $32_1$. The PEDOT/PSS sublayer $31_3$ is the uppermost PEDOT/PSS sublayer and has three mutually separate regions. The left-hand region of the PEDOT/PSS sublayer $33_3$ covers over the left-hand region of the PEDOT/PSS sublayer $32_2$ and the right-hand region of the PEDOT/PSS sublayer $33_3$ covers over the right-hand region of the PEDOT/PSS sublayer $32_2$.

In the FIG. 3 embodiment the PEDOT/PSS layer 32, for the sake of clarity, is formed only from three PEDOT/PSS sublayers. It can however be provided that each of the three PEDOT/PSS sublayers $32_1$ through $32_3$ is made up for example from 7 sublayers in each case so that the surface resistance of the three PEDOT/PSS sublayers together is about 350Ω, assuming the embossing film described with reference to FIG. 1. With the above-mentioned configuration of the three PEDOT/PSS sublayers, subregions are formed in which 7, 14 or 21 sublayers are arranged in mutually superposed relationship, which involve surface resistances of 350Ω, 250Ω or 150Ω.

Figure 4:
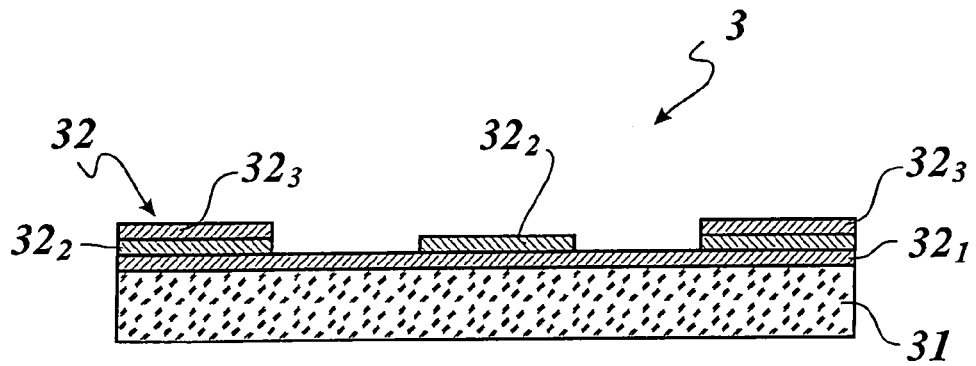
FIG. 4 shows a diagrammatic section along section line IV-IV in FIG. 3, FIGS. 5a, 5b show production steps of a third embodiment of the multilayer body according to the invention.

FIG. 4 shows the multilayer body along section line IV in FIG. 3. It is therefore not only possible to adjust the surface resistance of the PEDOT/PSS layer by the number of successively applied, mutually superposed PEDOT/PSS sublayers, but also to locally vary the surface resistance of the PEDOT/PSS layer. In addition a resistance gradient can be formed along the surface normal to the PEDOT/PSS layer. In that way it is possible for example to produce working resistors which are connected together and/or to other components, in which case the regions of the PEDOT/PSS layer with a low surface resistance can form conductor tracks which link the above-mentioned components together to form an electronic circuit.

Figure 5A:
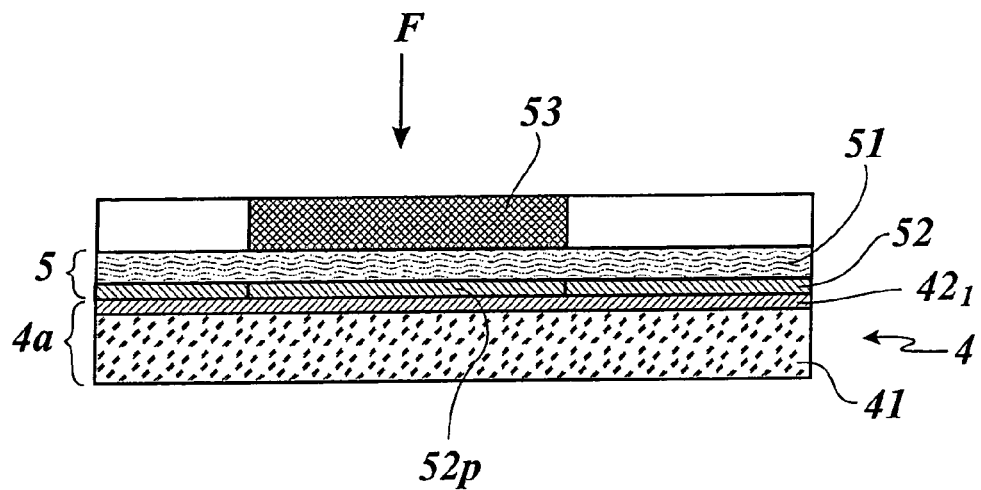
Figure 5B:
Figure 5B:
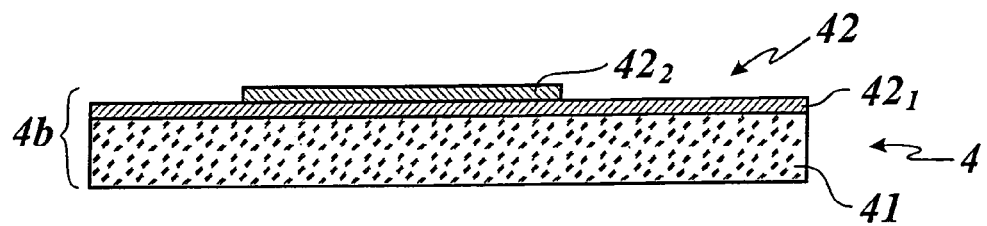

FIGS. 5a and 5b now show production steps for producing a multilayer body 4.

FIG. 5a shows a multilayer body 4a which forms the first production step for the multilayer body 4. The multilayer body 4a is formed from a carrier layer 41 and a first PEDOT/PSS sublayer $42_1$ which covers the carrier layer 41 over the full surface area.

The multilayer body 4a is in contact with an embossing film 5 formed from a carrier layer 51 and a transfer layer 52 of PEDOT/PSS. Now, from the embossing film 5, a portion 52p of the transfer layer 52 is transferred on to the multilayer body 4a by means of an embossing tool 53.

FIG. 5b now shows a multilayer body 4b, to the first PEDOT/PSS sublayer $42_1$ of which there is applied a second PEDOT/PSS sublayer $42_2$, wherein the second PEDOT/PSS sublayer $42_2$ is formed from the portion 52p of the transfer layer 52 of the embossing film 5 (FIG. 5a). FIG. 5b further shows the embossing film 52r which is pulled off the multilayer body 4b and which now has a residual transfer layer 52r which no longer has the detached portion 52p.

The production steps shown in FIGS. 5a and 5b can be repeated until the PEDOT/PSS layer is provided of the desired layer thickness and with the desired structure. In that respect it can be provided that different embossing tools 53 are successively used to provide for different structuring of one or more sublayers of the PEDOT/PSS layer, as described hereinbefore with reference to FIGS. 3 and 4. It can however also be provided that the PEDOT/PSS layer is transferred by means of a thermotransfer printer and is built up layerwise, in which respect it can be provided that the PEDOT/PSS layer is then subjected to film formation by a thermal pressing tool. It can also be provided that the embossing substratum is rough, structured or partially structured.

FIGS. 6a through 11b now show diagrammatic sectional views of embodiments of the embossing film according to the invention.

The embossing films are each formed from a carrier layer 41 and further layers on the carrier layer 41, the further layers forming a transfer layer which can be transferred on to a substrate by an embossing process under the action of temperature and/or pressure. The carrier layer is for example a PET carrier with a layer thickness of between 19 and 23 μm.

Arranged on the carrier layer 41 is a PEDOT/PSS layer forming a release layer 42a. That fundamental layer structure is provided in all embodiments shown in FIGS. 6a through 11b. In the illustrated embodiment the PEDOT/PSS layer is about 300 nm in thickness.

Figure 6A:
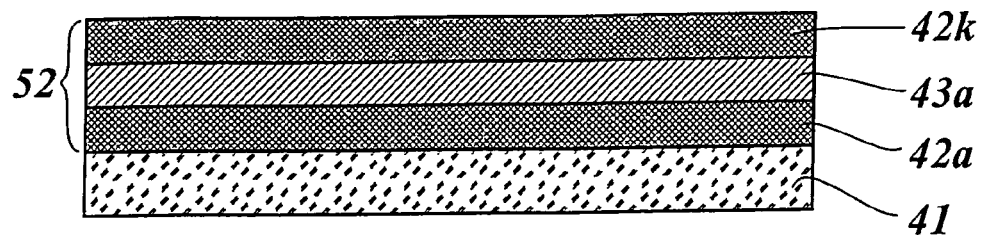
FIGS. 6a through 11b show embodiments of the embossing film according to the invention.

FIG. 6a shows an embossing film whose transfer layer is formed from three layers. Arranged on the release layer 42a is a metallic layer 43a covered by a second PEDOT/PSS layer in the form of an adhesive layer 42k. The metallic layer can preferably comprise silver, gold, copper, titanium or aluminum.

The release layer 42a and the adhesive layer 42k can differ in their chemical composition and/or their thickness which are so selected that both PEDOT/PSS layers optimally perform the intended functions. Optimisation can preferably be effected by test series.

The embossing film shown in FIG. 6a has N=1 metallic layers and N+1=2 PEDOT/PSS layers, wherein the number of kinds of metal X=1.

Figure 6B:
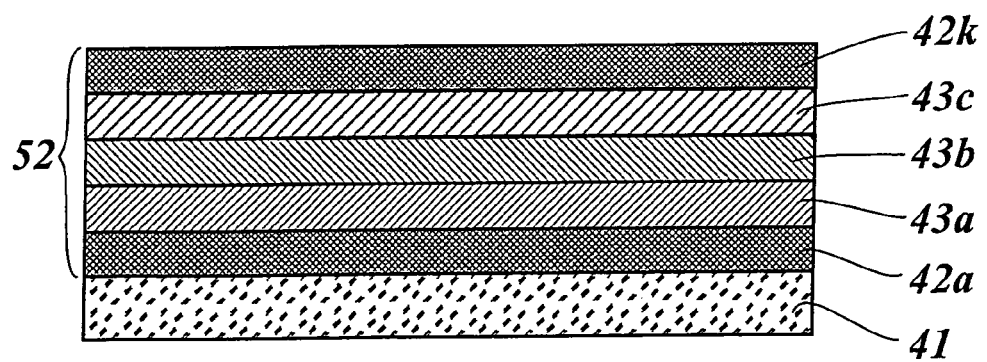

FIG. 6b shows an embossing film which in principle is like the embossing film shown in FIG. 6a, but in this case there are a plurality of mutually superposed metallic layers. The FIG. 6b embodiment involves three metallic layers 43a, 43b and 43c which each comprise a different material. It can be provided that, of the three metallic layers, at least two are of differing thickness.

The embossing film shown in FIG. 6b has N=1 electron-conducting layers comprising X=3 metallic layers 43a, 43b and 43c and N+1=2 PEDOT/PSS layers, wherein the number of kinds of metal Z=3.

Figure 7A:
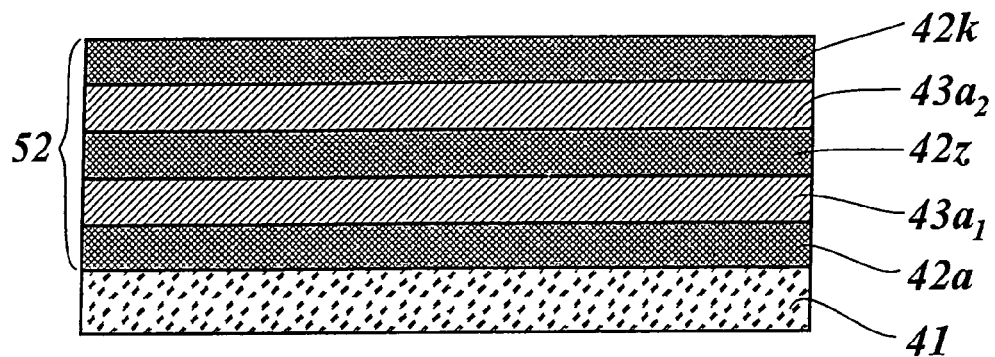

FIG. 7a now shows an embossing film having a further PEDOT/PSS layer. The further PEDOT/PSS layer forms an intermediate layer 42z arranged between two metallic layers $43a_1$ and $43a_2$. The intermediate layer 42z is provided to improve for example adhesion between the individual metallic layers.

As is also provided in the embodiments in FIGS. 6a and 6b, the three PEDOT/PSS layers can differ from each other in their chemical composition and/or their thickness.

The embossing film shown in FIG. 7a has N=2 electron-conducting layers comprising X=1 metallic layers 43a and N+1=3 PEDOT/PSS layers, wherein the number of kinds of metal Z=X=1.

Figure 7B:
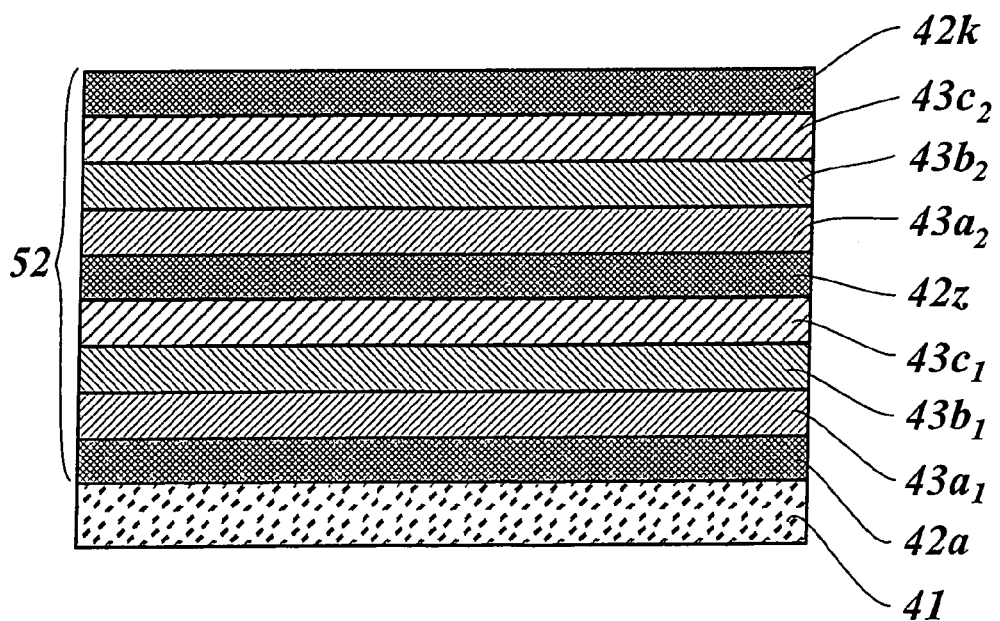

FIG. 7b now shows an embossing film which in principle is like the embossing film described with reference to FIG. 7a but in which the metallic layers are formed from a plurality of metallic layers $43a_1$, $43a_2$ through $43c_1$, $43c_2$. The metallic layers each involve the same layer succession, that is to say the layer succession a-b-c.

The embossing film shown in FIG. 7b has N=2 electron-conducting layers comprising X=3 metallic layers $43a_1$, $43a_2$ through $43c_1$, $43c_2$ and N+1=3 PEDOT/PSS layers, wherein the number of kinds of metal Z=X=3.

Figure 8A:
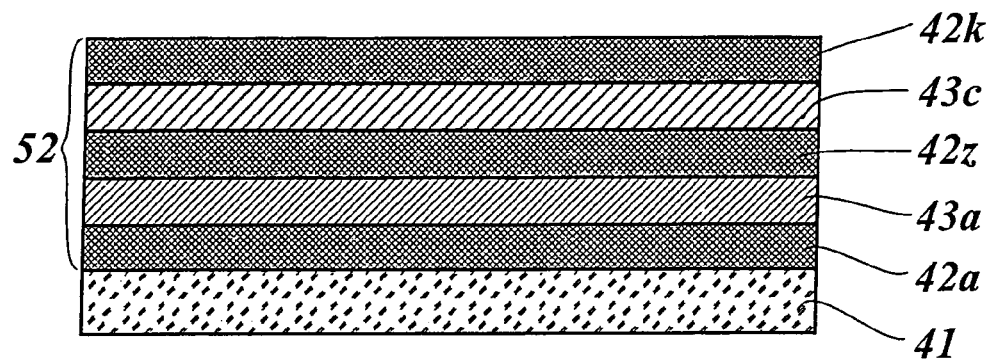

The FIG. 8a embodiment shows an embossing film whose transfer layer 52 is in principle like the transfer layer 52 in FIG. 7a, but the intermediate layer 42z is now disposed between metallic layers 43a and 43c of different material.

The embossing film shown in FIG. 8a has N=2 electron-conducting layers comprising X=1 metallic layers 43a and 43c, and N+1=3 PEDOT/PSS layers.

Figure 8B:
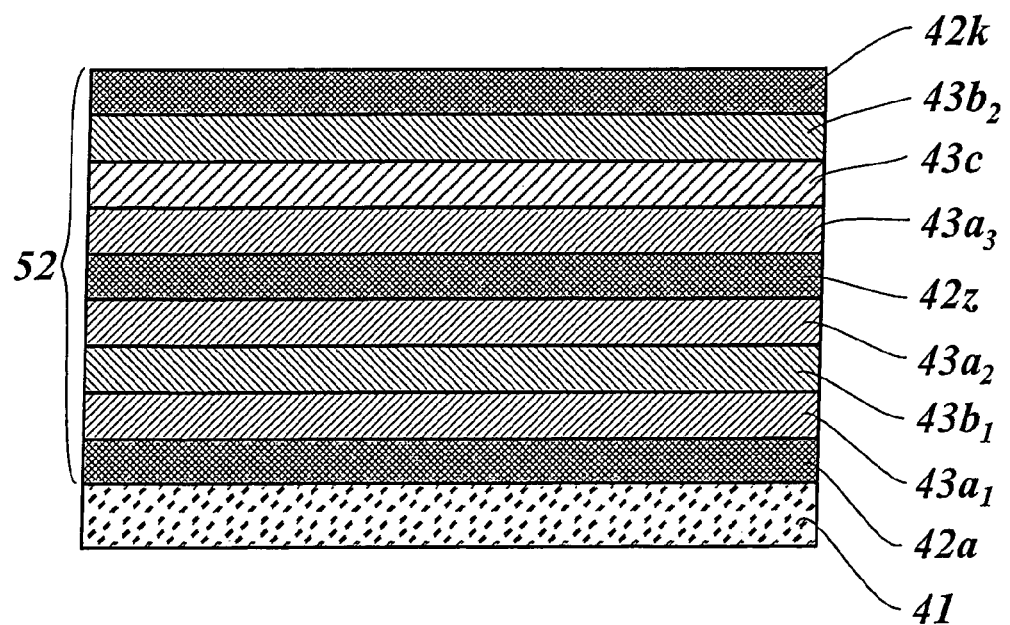

The embodiment in FIG. 8b has an embossing film whose transfer layer 52 is in principle like the transfer layer 52 in FIG. 7b, but the metallic layers arranged above and beneath the intermediate layer 42z now involve a different layer succession and/or different materials. The metallic layer beneath the intermediate layer 42z is formed from the mutually superposed layers $43a_1$, $43b_1$ and $43a_2$ and therefore involves the layer succession a-b-a. The metallic layer arranged over the intermediate layer is formed from the mutually superposed layers $43a_3$, 43c and $43b_2$ and therefore involves the layer successions a-c-b. As also noted in relation to the above-discussed embodiments of the embossing film the metallic layers can also differ in their thickness and the PEDOT/PSS layers can differ in their chemical composition and/or their thickness.

The embossing film in FIG. 8b has N=2 electron-conducting layers comprising $X_1=3$ metallic layers and $X_2=3$ metallic layers, and N+1=3 PEDOT/PSS layers, wherein the number of kinds of metal is $Z_1=3$ and $Z_2=2$. In general terms the following applies to the embodiment shown in FIG. 8a: number of the kinds of metal: $Z_1+Z_2+Z_3+\ldots+Z_N$ with $Z_1 \leqq X_1$, $Z_2 \leqq X_2$, $Z_3 \leqq X_3, \ldots, Z_N \leqq X_N$.

Figure 9A:
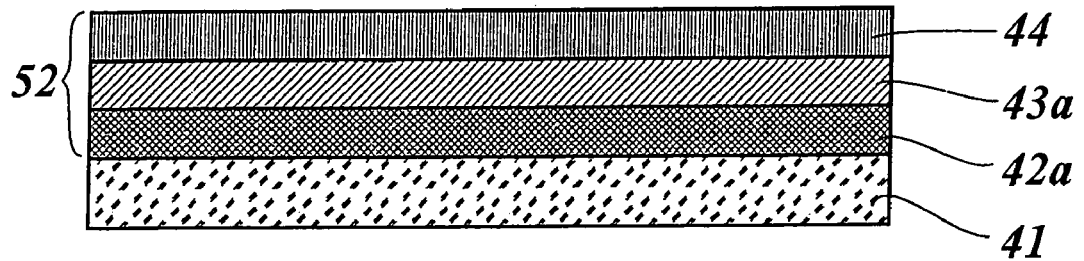
Figure 9B:
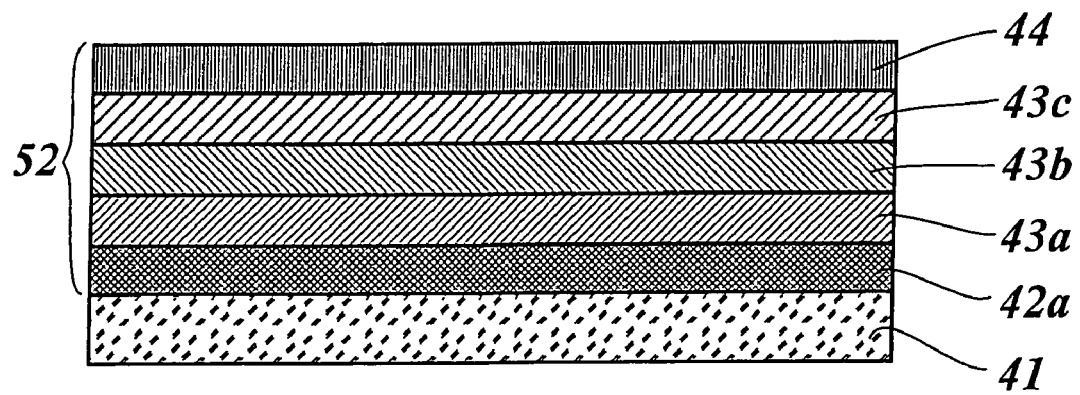

FIGS. 9a and 9b now show embodiments in which there is only one PEDOT/PSS layer, more specifically being the release layer 42a. The release layer 42a permits easy release of the transfer layer from the carrier layer. As indicated hereinbefore this involves a non-film-formed PEDOT/PSS layer which is easily releasable from the carrier layer which for example comprises PET.

FIG. 9a shows an embodiment which differs from the embodiment set forth hereinbefore in FIG. 6a in that, instead of the adhesive layer 42k of PEDOT/PSS, there is an adhesive layer 44 which is not formed from PEDOT/PSS. That layer can also be in the form of a priming layer. As is also provided for the other layers the adhesive layer 44 can also be formed from a plurality of layers. The material of the adhesive layer 44 can be for example a hot melt adhesive. The priming layer can comprise for example an acrylate mix. It can further be provided that fillers, additives and so forth are added to that priming layer to achieve desired properties.

The embossing film shown in FIG. 9a has N=1 metallic layers and N=1 PEDOT/PSS layers, wherein the number of kinds of metal is X=1.

FIG. 9b now shows in similar fashion an embodiment which differs from the embodiment of FIG. 6b in that, instead of the adhesive layer 42k formed from PEDOT/PSS, there is the adhesive layer 44 which is not formed from PEDOT/PSS.

The embossing film shown in FIG. 9b has N=1 electron-conducting layers comprising X=3 metallic layers 43a, 43b and 43c and N=1 PEDOT/PSS layers, wherein the number of kinds of metal is Z=3.

Figure 10A:
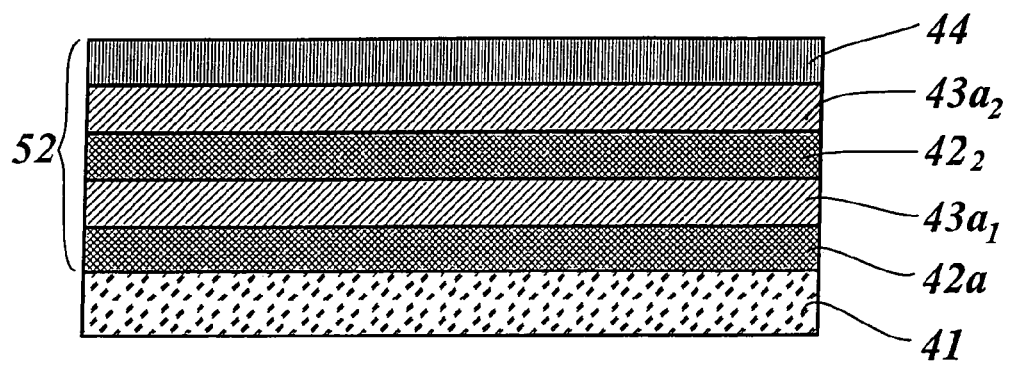
Figure 10B:
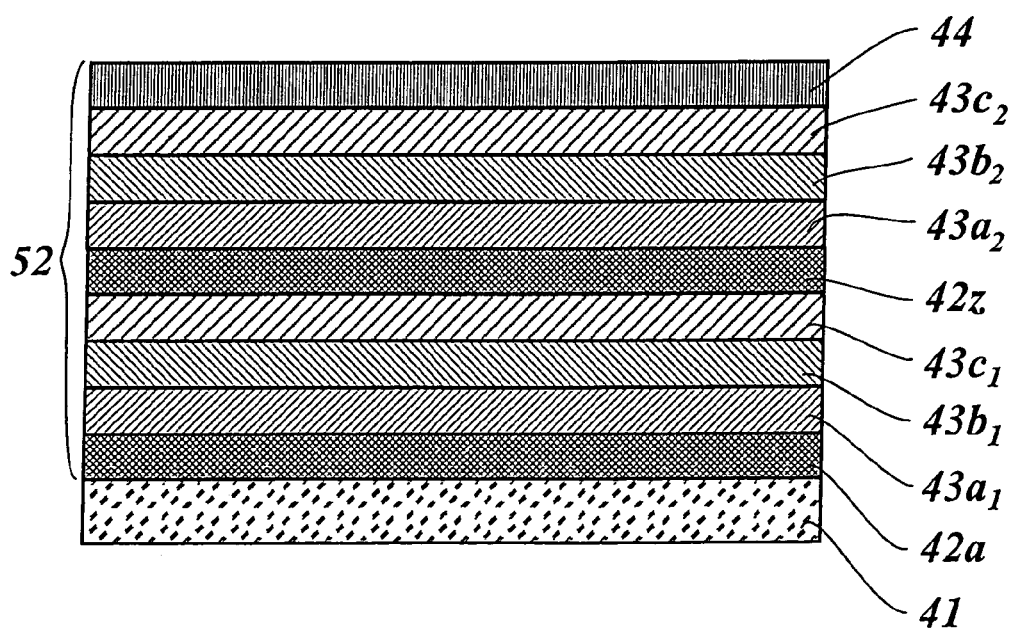
Figure 11A:
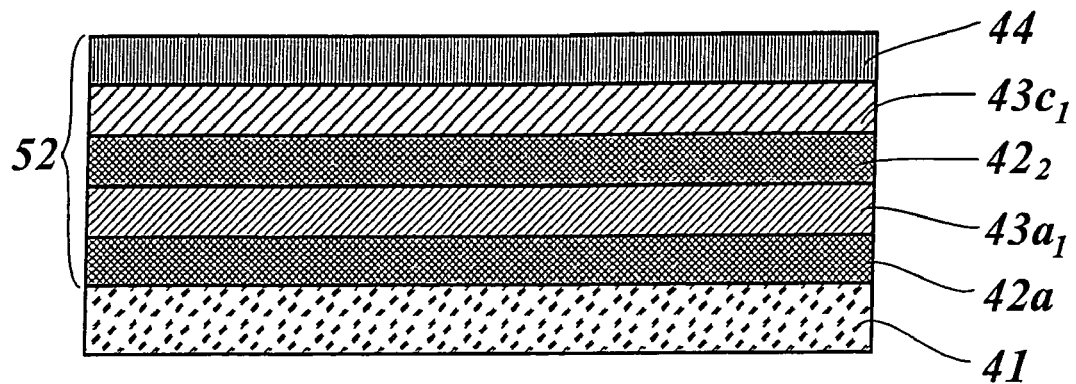
Figure 11B:
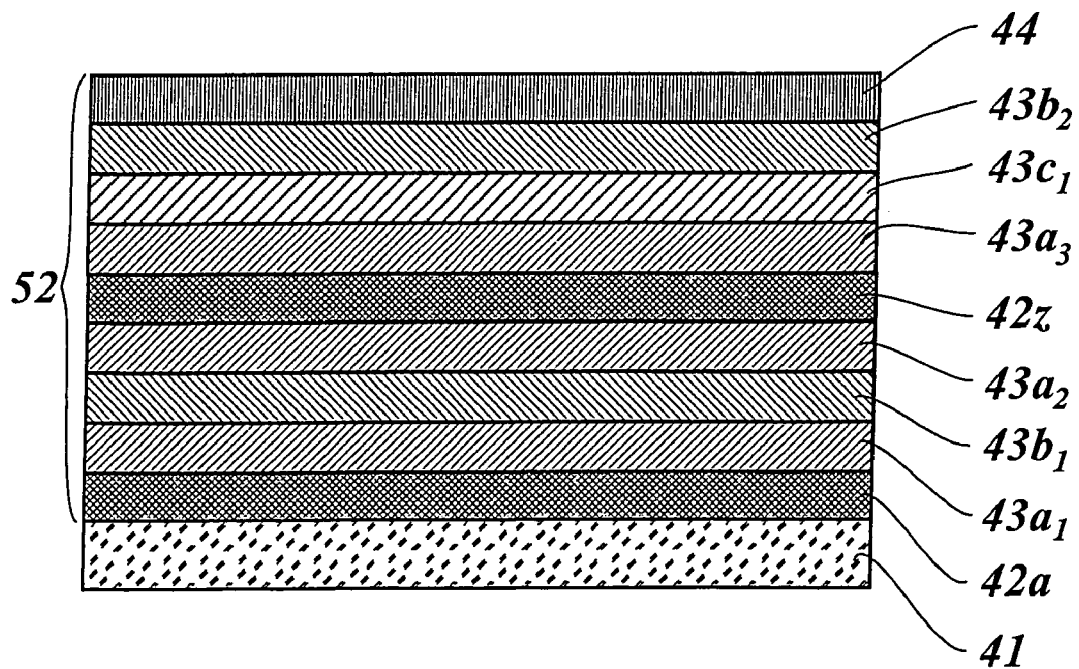

Further embodiments in which the adhesive layer 42k formed from PEDOT/PSS is replaced by the adhesive layer 44 which is not formed from PEDOT/PSS are shown in FIG. 10a (in other respects like FIG. 7a), FIG. 10b (in other respects like FIG. 7b), FIG. 11a (in other respects like FIG. 8a) and FIG. 11b (in other respects like FIG. 11b).

It can be provided that different embossing films are successively shaped one over the other to afford a multilayer body so that it is possible to produce from the embossing films shown by way of example in FIGS. 6a through 11b, multilayer bodies which are of optimum configuration by virtue of the choice of the embossing films and/or the combination of the embossing films, for an intended function.

The invention claimed is:

1. A process for the production of a multilayer body the process comprising the steps of:
    providing a transfer film with a discontinuous transfer layer having an electrically conductive polymer;
    transferring the transfer layer from the transfer film on to a carrier layer; and
    subjecting the transfer layer to a thermal pressing tool, whereby the transfer layer undergoes film-forming in the step of transferring the transfer layer on to the carrier layer due to the action of heat and/or the action of pressure and/or chemical reaction and is joined to the carrier layer to form a multilayer body having an electrically conductive layer arranged on a carrier layer.

2. A process as set forth in claim 1, wherein the transfer layer is in the form of a polymer transfer layer.

3. A process as set forth in claim 1, wherein the electrically conductive polymer of the transfer layer is concentrated in domains.

4. A process as set forth in claim 1, wherein one or more mutually superposed transfer layers are transferred by structured embossing of the carrier layer during said transferring step.

5. A process as set forth in claim 4, wherein, to produce gradients in respect of the resistance along the surface normal of the electrically conductive layer, a plurality of the transfer layers are used, each transfer layer having a different electrical conductivity.

6. A process as set forth in claim 1, wherein the conductive layer of the transfer film is embedded in other layers or is enclosed by other layers which in turn has different properties.

7. A process as set forth in claim 1, wherein the transfer layer of the transfer film comprises PEDOT/PSS.

8. A process as set forth in claim 7, wherein the transfer layer comprises PEDOT/PSS in a weight ratio of between 1:20 and 1:1.

9. A process as set forth in claim 1, wherein the transfer film comprises a plurality of regions of the transfer layer which are removed.

10. A process as set forth in claim 1, wherein the transfer layer of the transfer film has one or more layers comprising an electrically conductive polymer and one or more electron-conducting layers.

11. A process as set forth in claim 10, wherein, to provide the electron-conducting layer, a layer of silver, gold, copper, titanium, aluminum or a combination of those metals is applied by sputtering and/or vapor deposition.

12. A process as set forth in claim 10, wherein, to provide the electron-conducting layer, an electrically conductive paste is applied to the transfer layer by means of intaglio printing and/or screen printing and/or coating.

13. A process as set forth in claim 1, wherein the transfer layer is provided as a dried dispersion having the electrically conductive polymer such that the transfer layer does not form a continuous coherent film.

14. A process as set forth in claim 13, wherein the step of providing the transfer film comprises the steps of:
    spreading a dispersion having the electrically conductive polymer on a carrier film; and
    drying the dispersion to form the discontinuous transfer layer of the transfer film.

* * * * *

UNITED STATES PATENT AND TRADEMARK OFFICE
CERTIFICATE OF CORRECTION

PATENT NO. : 8,388,790 B2  Page 1 of 1
APPLICATION NO. : 12/309517
DATED : March 5, 2013
INVENTOR(S) : Schindler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this
First Day of September, 2015

Michelle K. Lee
*Director of the United States Patent and Trademark Office*